US011566145B2

(12) United States Patent
Loveday et al.

(10) Patent No.: US 11,566,145 B2
(45) Date of Patent: Jan. 31, 2023

(54) POLYURETHANE COATING COMPOSITIONS AND THEIR USE AS GEL COATS

(71) Applicant: COVESTRO LLC, Pittsburgh, PA (US)

(72) Inventors: Anthony R. Loveday, Weirton, WV (US); Jack R. Reese, Coraopolis, PA (US); Rick L. Adkins, Canonsburg, PA (US); David P. Zielinski, Cranberry Township, PA (US); James A. Thompson-Colón, Moon Township, PA (US); Alan D. Bushmire, Canonsburg, PA (US); Liang Chen, Sewickley, PA (US); Chen Xu, Wexford, PA (US)

(73) Assignee: COVESTRO LLC, Pittsburgh, PA (US)

( * ) Notice: Subject to any disclaimer, the term of this patent is extended or adjusted under 35 U.S.C. 154(b) by 973 days.

(21) Appl. No.: 16/373,929

(22) Filed: Apr. 3, 2019

(65) Prior Publication Data
US 2020/0291260 A1 Sep. 17, 2020

Related U.S. Application Data

(60) Provisional application No. 62/818,236, filed on Mar. 14, 2019.

(51) Int. Cl.
| | | |
|---|---|---|
| C08G 18/73 | (2006.01) | |
| C09D 175/04 | (2006.01) | |
| C08G 18/32 | (2006.01) | |
| B29C 37/00 | (2006.01) | |
| B29C 70/28 | (2006.01) | |
| C08J 5/04 | (2006.01) | |
| C08J 7/04 | (2020.01) | |
| B29K 309/08 | (2006.01) | |

(52) U.S. Cl.
CPC ........ C09D 175/04 (2013.01); B29C 37/0032 (2013.01); B29C 70/28 (2013.01); C08G 18/3218 (2013.01); C08G 18/73 (2013.01); C08J 5/043 (2013.01); C08J 7/0427 (2020.01); B29K 2309/08 (2013.01); C08J 2367/00 (2013.01); C08J 2475/04 (2013.01)

(58) Field of Classification Search
CPC .............. C09D 175/04; C09D 175/08; B29C 37/0032; B29C 70/28; B29C 70/086; B29C 37/0067; B29C 2037/0035; C08G 18/3218; C08G 18/73; C08G 18/4879; C08G 18/798; C08G 18/246; C08G 18/4875; C08G 18/4883; C08G 18/7837; C08G 18/792; C08K 5/00; C08J 5/043; C08J 7/0427; C08J 2367/00; C08J 2474/04; C08J 2367/06; C08J 2475/04; C08J 2474/08

USPC ......................................................... 264/334
See application file for complete search history.

(56) References Cited

U.S. PATENT DOCUMENTS

| | | | |
|---|---|---|---|
| 7,887,982 B2 | 2/2011 | Vijayendran et al. | |
| 8,053,468 B2 | 11/2011 | Selifonov | |
| 8,367,171 B2 | 2/2013 | Stenson et al. | |
| 8,420,747 B2 | 4/2013 | Malinoski et al. | |
| 8,895,660 B2 | 11/2014 | Alidedeoglu et al. | |
| 9,034,471 B2 | 5/2015 | Grau et al. | |
| 9,109,137 B2 | 8/2015 | Lindekens et al. | |
| 9,475,956 B2 | 10/2016 | Beccaria et al. | |
| 10,544,158 B1* | 1/2020 | Loveday | C08G 65/2663 |
| 11,168,231 B2* | 11/2021 | Fan | C08G 18/4808 |
| 2007/0237965 A1 | 10/2007 | Rosthauser | |
| 2007/0287762 A1* | 12/2007 | Casati | C08G 18/4072 521/172 |
| 2009/0018300 A1 | 1/2009 | Bloom et al. | |
| 2009/0226644 A1 | 9/2009 | Wylie et al. | |
| 2013/0261222 A1 | 10/2013 | Schiraldi et al. | |
| 2015/0050503 A1 | 2/2015 | Hupka et al. | |
| 2015/0094419 A1 | 4/2015 | Alzer et al. | |
| 2016/0282515 A1 | 9/2016 | Tsukada et al. | |
| 2017/0291989 A1 | 10/2017 | Delmas et al. | |
| 2018/0016385 A1 | 1/2018 | Ryu et al. | |

FOREIGN PATENT DOCUMENTS

| | | |
|---|---|---|
| JP | 2013142128 A | 7/2013 |
| WO | 2012005648 A1 | 1/2012 |
| WO | 2017003620 A1 | 1/2017 |
| WO | 2018236192 A1 | 12/2018 |

OTHER PUBLICATIONS

Jiang et al; "Synthesis and characterization of polyurethane rigid foams from polyether polyols with isosorbide as the bio-based starting agent"; Journal of Polymer Research (2018) 25:140; Published online: May 22, 2018; Springer Science+Business Media B.V., part of Springer Nature 2018.

* cited by examiner

*Primary Examiner* — Hannah J Pak
(74) *Attorney, Agent, or Firm* — Richard P. Bender; John E. Mrozinski, Jr.

(57) ABSTRACT

Polyurethane coating compositions are disclosed that include an isocyanate-reactive component that includes a polycyclic polyether polyol that is the reaction product of a reaction mixture that includes a polycyclic polyol starter, and an alkylene oxide, as well as an isocyanate-functional component that includes a non-aromatic polyisocyanate. The polyurethane coating compositions may be particularly useful as a gel coat in the manufacture of glass fiber reinforced plastics.

20 Claims, No Drawings

POLYURETHANE COATING COMPOSITIONS AND THEIR USE AS GEL COATS

FIELD

This specification pertains generally to polyurethane coating compositions that include a polycyclic polyether polyol that is the reaction product of a reaction mixture that includes a polycyclic polyol starter and an alkylene oxide. The coating compositions may be particularly suitable for us as a gel coat on fiber-reinforced composites.

BACKGROUND

Articles constructed of glass fiber reinforced plastics ("FRPs") include, among others, glass fiber marine craft, showers and bathtubs, building and automotive panels, swimming pools, and satellite dishes. In conventional FRP construction, a release agent, such as a wax, is applied to a mold, a gel coat is applied to the waxed mold, and a glass fiber reinforced laminate is applied to the gel coat. The FRP is ultimately removed from the mold to provide the glass fiber reinforced laminate covered by a decorative gel coat layer. The gel coat layer should provide a desired aesthetic appearance and impart durability, ultraviolet ("UV") degradation resistance and hydrolysis resistance to the FRP.

In many cases, the gel coat and the laminate utilize an unsaturated polyester resin. The unsaturated polyester resin binds the glass fiber reinforcement and is often a styrene or styrene/methyl methacrylate, free radical initiated, liquid thermo-setting resin which upon catalysis with an organic peroxide such as methyl ethyl ketone peroxide, gels and cures to a solid thermosetting state. Such gel coats, while widely used, are not without drawbacks. For example, while hard, they are brittle and readily susceptible to cracking.

As an alternative, polyaspartate based gel coats have been developed. These gel coats can have excellent properties, including tensile strength, tear strength, and elongation relative to unsaturated polyester based gel coats. In addition, as compared to unsaturated polyester based gel coats, they have a greater ability to maintain their gloss level over time after exposure to sunlight and other elements. A drawback to polyaspartate based gel coats, however, is that they can exhibit incompatibility with the unsaturated polyester backing resin technology that is often glass fiber reinforced laminate. This can lead to poor interfacial curing and delamination.

As a result, it would be desirable to provide a gel coat that, while hard, is significantly tougher than traditional unsaturated polyester based gel coats and, as a result, less susceptible to cracking. Moreover, it would be desirable to provide such a gel coat that does not rely on amine chemistry and is, as a result, compatible with unsaturated polyester resin in an underlying glass fiber reinforced laminate. It would further be desirable if such a gel coat were produced utilizing biorenewable materials.

SUMMARY

In certain respects, the present disclosure is directed to coating compositions comprising: (a) a isocyanate-reactive component comprising a polycyclic polyether polyol that is the reaction product of a reaction mixture comprising: (i) a polycyclic polyol starter, and (ii) an alkylene oxide; and (b) an isocyanate-functional component comprising a non-aromatic polyisocyanate.

In other respects, this disclosure relates to coating compositions comprising: (a) a isocyanate-reactive component comprising a polycyclic polyether polyol with a hydroxyl functionality of 2 to 2.5 and a number average molecular weight of 200 Da to 400, wherein the polycyclic polyether polyol is a reaction product of a reaction mixture comprising: (i) a polycyclic polyol starter comprising a tricyclodecane unit, a bicyclodecane, a norbornane unit, a bicyclooctane unit, bicyclononane unit, an isosorbide unit, or a bicycloundecane unit, and (ii) an alkylene oxide; and (b) an isocyanate-functional component comprising a non-aromatic polyisocyanate.

The present specification is also directed to, among other things, coatings formed from such compositions, substrates at least partially coated with such a coating, and methods of coating a substrate with such compositions.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of the polyurethane coatings described in this specification, the hydroxyl groups react with isocyanate groups, —NCO, that are attached to an aliphatic polyisocyanate. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

Equivalent weights and molecular weights given herein in Daltons (Da) are number average equivalent weights and number average molecular weights respectively, as determined by GPC as described herein, unless indicated otherwise.

The number average and weight average, Mn and Mw, respectively, molecular weights reported herein can be determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As indicated, the coating compositions of this disclosure comprise an isocyanate-reactive component. As used herein, "isocyanate-reactive component" refers to a component of the coating composition that includes one or more ingredients that contain functional groups that are reactive with isocyanate groups, such as, for example, hydroxyl groups and amine groups, among others.

In the coating compositions of this specification, the isocyanate-reactive component comprises a polycyclic polyether polyol that is the reaction product of a reaction mixture comprising: (i) a polycyclic polyol starter, and (ii) an alkylene oxide.

As used herein, the term "polycyclic polyol" refers to a compound that includes, per molecule, at least two reactive —OH groups and at least two cyclic groups in which one or more atoms (sometimes two or more atoms) are present in the rings of at least two cyclic groups. In some implementations, the polycyclic polyol comprises a polycyclic diol, i.e., a polycyclic polyol that contain two reactive —OH groups per molecule. Polycyclic triols (three reactive —OH groups per molecule) and higher functionality polyols can, however, also be readily envisioned.

In some implementations, the polycyclic polyol starter comprises a bicyclic polyol (two rings per molecule), a tricyclic polyol (three rings per molecule), and/or a polycyclic polyol that includes four or more rings per molecule. In each case, the rings of the polycyclic group may be saturated, i.e., aliphatic, or unsaturated. Moreover, in each case, the polycyclic groups may include any combination of cyclic groups of various ring sizes, including rings of 3 atoms, 4 atoms, 5 atoms, 6 atoms, and/or 7 or more atoms. Furthermore, in each case, the polycyclic groups may be unsubstituted or substituted, such as with one or more heteroatoms, such as nitrogen, oxygen, silicon, sulfur and/or another heteratom. In certain implementations, the polycyclic polyol starter comprises a dicyclic diol in which the cyclic groups include an ether (C—O—C) linkage.

In some implementations, the polycyclic polyol starter comprises a bicyclic diol and/or a tricyclic diol. Specific examples of suitable bicyclic and tricyclic units that may be present in such bicyclic diols and tricyclic diols are tricyclodecane (structure A), bicyclodecane (structure B), norbornane (structure C), bicyclooctane (structure D), bicyclononane (structure E), isosorbide (structure F), and bicycloundecane:

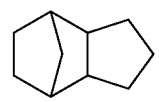

A

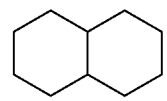

B

C

D

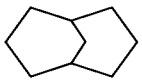

E

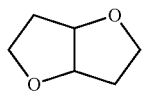

F

In some implementations, the polycyclic polyol starter comprises a dicyclic diol comprising any of the 1,4:3,6-dianhydrohexitols, such as isosorbide, isomannide, isoidide, isogalactide, isofucide and isoinoside.

If desired, in addition to the polycyclic polyol starter, the reaction mixture may include one or more additional hydroxyl and/or amine functional starter. In some implementations, for example, such additional starter(s) may comprise trimethylolethane, trimethylolpropane, glycerol, pentaerythritol, 4,4'-dihydroxydiphenyl-propane, sorbitol, sucrose, ethylenediamine, monoethanolamine, diethanolamine, methyl amine, ethylene diamine, diethylene triamine, triethylene tetramine, triethanolamine, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, aniline, 4,4'-methylene dianiline, 2,3-toluene diamine, 3,4-toluene diamine, 2,4-toluene diamine, and 2,6-toluene diamine, ammonia, ethanolamine, triethanolamine, and ethylene diamine, or a mixture of any two or more of the foregoing. Oligomeric and/or polymeric polyols, such as polyether polyols, including polycyclic polyether polyols, are also suitable starters, as are methylene-bridged polyphenyl polyamines composed of isomers of methylene dianilines and triamines or polyamines of higher molecular weight prepared by reacting aniline with formaldehyde, and Mannich reaction products of phenol or substituted phenols with alkanol amines and formaldehyde or paraformaldehyde.

In some implementations, however, the polycyclic polyol starter is present in an amount of at least 50% by weight, in some cases, at least 80% by weight, at least 90% by weight, or, in yet other cases, at least 98% by weight or at least 99% by weight, based on the total weight of H-functional starter used to prepare the polycyclic polyether polyol.

As indicated, the reaction mixture used to prepare the polycyclic polyether polyol also comprises an alkylene oxide. Examples of alkylene oxides useful in producing the polyether polyols include: ethylene oxide, propylene oxide, butylene oxide, styrene oxide, epichlorohydrin and mixtures thereof. The alkylene oxides may be added as mixtures or added sequentially to produce block copolymers. In one embodiment, the alkylene oxide comprises ethylene oxide, propylene oxide and/or a mixture thereof. When used in a mixture, ethylene oxide can be added into the backbone (i.e. polyol is terminated with propylene oxide) or can be added to give an ethylene oxide cap.

In certain implementations, the reaction to produce the foregoing polycyclic polyether polyol occurs in the presence of an alkoxylation catalyst. Suitable alkoxylation catalysts for preparing the foregoing polyether polyols include, for example, sodium hydroxide, potassium hydroxide, sodium or potassium methoxide, sodium stearate, calcium oxide, and N-methyl imidazole. Also suitable are double metal cyanide (DMC) catalysts such as those disclosed in U.S. Pat. Nos. 5,783,513, 6,303,533, and 6,303,833, the disclosures of which being incorporated herein by reference.

In certain implementations, the polycyclic polyether polyol has a hydroxyl functionality is at least 1.5, such as 1.5 to 6, 1.5 to 4, 1.5 to 3, 2 to 3, or 2 to 2.5. In certain implementations, the polycyclic polyether polyol has a number average molecular weight of no more than 1,500 Da, such as no more than 1,000 Da, no more than 500 Da, or no more than 400 Da, such as 200 Da to 800 Da, 200 Da to 600 Da, 200 Da to 400 Da, or 250 Da to 350 Da.

For example, in some implementations, the polycyclic polyether polyol has a hydroxyl functionality of 2 to 2.5, a number average molecular weight of 200 Da to 400 Da and is the reaction product of a reaction mixture comprising: (i) a 1,4:3,6-dianhydrohexitol, and (ii) propylene oxide.

In addition to the polycyclic polyether polyol described above, the isocyanate-reactive component may comprise additional isocyanate-reactive components. For example, the isocyanate-reactive component may include additional polyols different from the polycyclic polyether polyols described above. Suitable such polyols include polyhydroxy compounds having at least 2 hydroxyl groups in the molecule and a hydroxyl group content of at least 5.0% by weight, at least 7.0% by weight or, in some cases, at least 7.5% by weight, based on the weight of the polyhydroxy compound. In some implementations, the upper limit of the hydroxyl group content is 10% by weight.

Examples of suitable polyols include aliphatic hydrocarbon polyols, polyether polyols, polyester polyols, acrylic polyols, epoxypolyols, polycarbonate polyols, and urethane polyols. Each of these may be used alone or in combination as a mixture.

Suitable aliphatic hydrocarbon polyols include, for example, a hydroxyl group-terminated polybutadiene and a hydrogenated product thereof.

Suitable polyether polyols are, for example, polyether polyols obtained by addition polymerization of one or more alkylene oxides (e.g., ethylene oxide, and propylene oxide) or a mixture thereof with one or more hydroxyl and/or amine functional starters (such as any of those described earlier); and polymer polyols obtained by polymerizing acryl amide which is formed using polytetramethylene glycol and a polyether polyol thereof as a medium.

Suitable polyester polyols are, for example, those obtained by condensation reaction of one or more carboxylic acids (such as succinic acid, adipic acid, sebacic acid, dimer acid, maleic anhydride, fumaric anhydride, isophthalic acid, and terephthalic acid) or a mixture thereof, with one or more polyols (such as ethylene glycol, propylene glycol, diethylene glycol, neopentyl glycol, trimethylolpropane, and glycerin) or a mixture thereof; polycaprolactone obtained by ring-opening polymerization of ε-caprolactone and polyhydric alcohol; and ester of an aliphatic compound having a hydroxyl group such as castor oil, with polyhydric alcohol.

Suitable acryl polyols include, for example, those obtained by copolymerizing polymerizable monomers each having at least one active hydrogen atom in the molecule, with monomers copolymerizable with the above-mentioned monomers. For example, the acryl polyols include acryl polyol resins obtained by polymerizing (i) one monomer or a mixture of at least 2 monomers selected from the group consisting of acrylates each having active hydrogen atom(s), such as 2-hydroxyethyl acrylate, 2-hydroxypropyl acrylate, and 2-hydroxybuthyl acrylate; methacrylates each having active hydrogen atom(s), such as 2-hydroxyethyl methacrylate, 2-hydroxypropyl methacrylate, and 2-hydroxybuthyl methacrylate; and methacrylic acids and acrylic acids each having polyhydric active hydrogen, such as monoacrylate or monomethacrylate of glycerin, and monoacrylate or monomethacrylate of trimethylolpropane, and (ii) one monomer or a mixture of at least 2 monomers selected from the group consisting of methyl acrylate, ethyl acrylate, isopropyl acrylate, n-butyl acrylate, and 2-ethylhexyl acrylate; and methacrylates such as methyl methacrylate, ethyl methacrylate, isopropyl methacrylate, n-butyl methacrylate, isobutyl methacrylate, and 2-hexyl methacrylate, in the presence or absence of (iii) one monomer or a mixture of at least 2 monomers selected from the group consisting of unsaturated carboxylic acids such as acrylic acid, methacrylic acid and itaconic acid; unsaturated amides such as acrylamide and N-methylol acrylamide; and polymerizable monomers such as styrene, vinyl toluene, vinyl acetate and acrylonitrile.

Suitable epoxy polyols include, for example, novolaks, β-methylepichlorohydrins, cyclic oxiranes, glycidyl ethers, glycidyl esters, glycol ethers, epoxydized aliphatic unsaturated compounds, epoxydized aliphatic esters, polyvalent carboxylates, aminoglycidyls, and resorcins. Suitable polycarbonate polyols, include, for example, polycarbonate polyols obtained from aromatic polyhydric alcohols such as bisphenol A, or aliphatic or alicyclic polyhydric alcohols such as 1,6-hexane diol as raw materials.

Suitable urethane polyols include, for example, polymers having an urethane bond therein and a hydroxyl group at its side chain or end, which can be produced by polyaddition reaction of aromatic, aliphatic or alicyclic diisocyanates with active hydrogen-containing compounds.

In addition to, or in lieu of, additional polyols, the isocyanate-reactive component may, if desired, comprise a polyaspartic acid ester. Such polyaspartic acid esters may comprise the reaction product of one or more diamines, one or more difunctional acrylate-containing compounds and one or more maleic/fumaric acid esters. The diamine, acrylate and ester are, in some implementations, reacted together in a ratio of from 1 mole amine:0.1 moles acrylate:0.9 moles maleate, to 1 mole amine:0.02 moles acrylate:0.98 moles maleate, such as from 1 mole amine:0.05 moles acrylate: 0.95 moles maleate, to 1 mole amine:0.02 moles acrylate: 0.98 moles maleate.

In certain implementations, in the acrylate/ester mixture, acrylate is present in an amount of 1-2 wt. %, such as 1.5-2 wt. %, with the remainder being acid ester.

Suitable diamines for use in preparing the polyaspartic acid ester include, without limitation, ethylenediamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1, 6-diamino-hexane, 1,11-diaminoundecane, 1,12-diaminododecane, 1,3- and/or 1,4-cyclohexane diamine, 1-amino-3,3, 5-trimethyl-5-aminomethyl-cyclohexane, 2,4- and/or 2,6-hexahydrotoluoylene diamine, 2,4'- and/or 4,4'-diaminodicyclohexyl methane and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4- and/or 2,6-diaminotoluene and 2,4'- and/or 4,4'-diaminodiphenyl methane, 1,3,3-trimethyl-1-aminomethyl-5-aminocyclohexane (IPDA), 1,8-p-diaminomenthane, bis(4-aminocyclohexyl)methane, bis(4-amino-3-methylcyclohexyl)-methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclo-hexyl)propane, 1,1-bis(4-amino-3,5-dimethyl-cyclohexyl)ethane, 2,2-bis(4-amino-3,5-dimethylcyclohexyl)propane, 2,2-bis(4-amino-3,5-dimethylcyclohexyl)butane, 2,4-diamino-dicyclohexylmethane, 4-aminocyclohexyl-4-amino-3-methyl-cyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane, as well as mixtures of two or more of any of the foregoing.

Also suitable are aromatic diamines such as, for example, 1,4-diaminobenzene, 1,3-bis(aminomethyl)benzene (MXDA), 2,4- and/or 2,6-diaminotoluene, 2,4'- and/or 4,4'-iaminodiphenylmethane, 3,3'-dimethyl-4,4'-diaminodiphenylmethane, 3,3'-dichloro-4,4'-diaminodiphenylmethane (MOCA), 1-methyl-3,5-bis(methylthio)-2,4- and/or 2,6-diaminobenzene, 1-methyl-3,5-diethyl-2,4-diaminobenzene and/or 1-methyl-3,5-diethyl-2,6-diaminobenzene (i.e. DETDA), 1,3,5-trimethyl-2,4-diaminobenzene, 1,3,5-triethyl-2,4-diaminobenzene, 1,3,5-triisopropyl-2,4-diaminobenzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenyl-methane, 1-methyl-2,6-diamino-3-isopropylbenzene, 3,5-dithiomethyl-2,4-diamino toluene (i.e. ETHACURE 300); 4,6-dimethyl-2-ethyl-1,3-diaminobenzene; 3,5,3',5'-tetraethyl-4, 4-diaminodiphenyl-methane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylene-diamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylene-diamine; 4,6-di-sec-butyl-m-phenylenediamine; 4-ethyl-6-tert-butyl-m-phenylene-diamine; 4-ethyl-6-sec-butyl-m-phenylenediamine; 4-ethyl-6-isobutyl-m-phenylene-diamine; 4-isopropyl-6-isobutyl-m-phenylene-diamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylene-diamine; 4,6-dicyclopentyl-m-phenylenediamine. Any of the above may, of course, also be used as mixtures.

Maleic or fumaric acid esters suitable for use in preparing the polyaspartic acid ester are compounds of the formula:

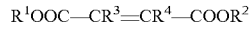

$$R^1OOC-CR^3=CR^4-COOR^2$$

in which $R^1$, $R^2$, $R^3$ and $R_4$ are groups that are "inert to isocyanate groups under the reaction conditions," which means that these groups do not have Zerevitinov-active hydrogens (CH-acid compounds; cf. Rompp Chemie Lexikon, Georg Thieme Verlag Stuttgart), such as OH, NH or SH. In some implementations, $R^1$ and $R^2$, independently of one another, are $C_1$ to $C_{10}$ alkyl residues, such as methyl or ethyl residues. $R^3$ and $R^4$ are, in some implementations, hydrogen. Examples of suitable maleic or fumaric acid esters are dimethyl maleate, diethyl maleate, dibutyl maleate and the corresponding fumarates.

Suitable difunctional acrylate-containing compounds for use in preparing the polyaspartic acid ester, include, for example, ethylene glycol diacrylate, propane 1,3-diol diacrylate, butane 1,4-diol diacrylate, hexane 1,6-diol diacrylate, and the corresponding methacrylates. Also suitable are di(meth)acrylates of polyether glycols of initiated with ethylene glycol, propane 1,3-diol, butane 1,4-diol.

Such polyaspartic acid esters can be prepared by reacting, in a first step, a diamine with a difunctional acrylate-containing compound to form a first reaction product and, in a second step, the first reaction product is reacted with a maleic/fumaric acid ester. Both first and second steps are, in some implementations, carried out in the absence of any catalyst. The reaction may be carried out at atmospheric pressure, under a nitrogen blanket, a temperature of 50°-55° C., with exotherm controlled by the rate of addition, so that the temperature is kept in this range. Typically, preparation is carried out over a period of 12-24 hours, under monitoring, and the reaction stopped when the desired unsaturation level is obtained.

In certain implementations, the polycyclic polyether polyol that is the reaction product of a reaction mixture comprising a polycyclic polyol starter and an alkylene oxide is present in an amount of at least 50% by weight, in some cases, at least 80% by weight, at least 90% by weight, or, in yet other cases, at least 98% by weight or at least 99% by weight, based on the total weight of ingredients that contain functional groups that are reactive with isocyanate groups present in the isocyanate-reactive component.

As indicated, the coating compositions of the present invention comprise an isocyanate-functional component comprising a non-aromatic polyisocyanate. As used herein, "isocyanate-functional component" refers to a component of the coating composition that includes one or more ingredients that contain isocyanate (—NCO) functional groups.

Non-limiting examples of suitable non-aromatic polyisocyanates include monomeric aliphatic, cycloaliphatic, and/or araliphatic diisocyanates. Examples of diisocyanates include 1,6-diisocyanatohexane, 1-isocyanato-3,3,5-trimethyl-5-isocyanatomethylcyclohexane (isophorone diisocyanate), 4,4-diisocyanatodicyclohexylmethane, 1,4-diisocyanatocyclohexane, 1-methyl-2,4-diisocyanatocyclohexane, 1-methyl-2,6-diisocyanatocyclohexane and mixtures thereof.

The polyisocyanates of the aforementioned kind often have an NCO group content of 10 to 25% by weight, an average NCO functionality of 2.0 to 5.0, and a residual amount of monomeric diisocyanates, used for their preparation, of below 1% by weight, often below 0.5% by weight.

Suitable polyisocyanates include oligomeric polyisocyanates including, but not limited to, dimers, such as the uretdione of 1,6-hexamethylene diisocyanate, trimers, such as the biuret, allophonate, and/or isocyanurate of 1,6-hexanediisocyanate and the isocyanurate of isophorone diisocyanate, and polymeric oligomers. Modified polyisocyanates can also be used, including, but not limited to, carbodiimides and uretdiones, and mixtures thereof. In some implmentations, however, the non-aromatic polyisocyanate contains biuret, isocyanurate, allophonate, and/or iminooxadiazinedione structures. Polyisocyanates containing iminooxadiazinedione groups, and their preparation, can be found in, for example, EP-A 798 299, EP-A 896 009, EP-A 962 454 and EP-A 962 455. In some implementations, the non-aromatic polyisocyanate comprises aliphatic, aliphatic/cycloaliphatic and/or cycloaliphatic single-type or mixed trimers based on 1,6-diisocyanatohexane ("HDI") and/or isophorone diisocyanate, which are obtainable in accordance, for example, with U.S. Pat. Nos. 4,324,879, 4,288,586, DE-A 310 026 2, DE-A 310 026 3, DE-A 303 386 0 or DE-A 314 467 2, which are incorporated herein by reference. Suitable non-aromatic polyisocyanates are commercially available under the designation DESMODUR® from Covestro LLC, Pittsburgh, Pa. including DESMODUR® N 100 (HDI biuret), DESMODUR® N 3200 (HDI biuret), DESMODUR® N 3300A (HDI trimer), DESMODUR® N 3400 (HDI uretdione), DESMODUR® N 3500 (HDI allophanate trimer, NCO group content of 19.5% by weight, average NCO functionality of 4.6), DESMODUR® N 3900 (Aliphatic polyisocyanate resin based on HDI, NCO group content of 23.5% by weight, average NCO functionality of 3.2), DESMODUR® XP 2617 (largely linear NCO prepolymer based on HDI, NCO group content of 12.5% by weight, average NCO functionality of 2.0), and DESMODUR® XP 2580 (aliphatic polyisocyanate based on HDI, NCO group content of 19.5% by weight, average NCO functionality of 2.5).

In certain implementations, the isocyanate-reactive component and the isocyanate-functional component are present in the coating composition in amounts such that the molar ratio of the isocyanate-reactive groups to isocyanate groups in the coating composition is within the range of 1.0:0.8 to 1.0:2.0.

The coating compositions of this specification can optionally include additional additives, as are known in the art, non-limiting examples of which are plasticizers, defoamers, moisture scavengers, thickeners, catalysts, fillers, emulsifiers, surface-active stabilizers, pigments, dyes, UV-stabilizers, hindered-amine light stabilizers, antioxidants, leveling additives, dispersing and grinding aids, impact modifiers, flame-retardants, biocides, and the like. In certain implementations, these additional additives are present in the isocyanate-reactive component prior to its mixture with the isocyanate-reactive component.

In certain implementations, the isocyanate-reactive component, which includes isocyanate-reactive ingredients and one or more additive is premixed, such as with a Cowels® type mixing blade or similar equipment, and then the isocyanate-reactive component is then combined with the pre-mixture in a manner suitable to facilitate mixing and reaction thereof, and to enable coating of the mixed composition onto the desired substrate prior to completion of the reaction.

In some implementations, the isocyanate-reactive component and the isocyanate-functional component are mixed together using a plural component positive displacement mixing spray system, wherein the spray combines streams of the compositions with complete mixing and simultaneous application of the mixed spray to the intended substrate. The system will often include the following components: a proportioning section which meters the components and pressurizes the material; optionally, a heating section to raise the temperatures of the components to adjust the viscosity; and an impingement spray gun which combines the two components and allows mixing just prior to atomization. Alternatively, the spray system may comprise a short static mixing element at the end of the spray nozzle to assist in accomplishing complete mixing. Alternatively, the coating composition may be prepared by mixing in a static mix device to achieve blending of the compositions. However, at the spray gun, the components are combined and pumped through a length of tubing which contains elements designed to mix the components prior to atomizing.

It some implementations, it may be desirable to use equipment which can operate at low pressure. As used herein, the term "low pressure" means pressures below 2,500 psi. In some cases, the spraying is carried out at pressures from 300-2000 psi, such as 300 to 1500 psi, or, in some cases, 300 to 1,000 psi.

As will be appreciated by the ordinarily skilled artisan, the viscosity behavior of each of the components can be particularly important for two part spray coating processes. With low pressure positive displacement mixing, the two parts, in many cases, should be as close as possible in viscosity to allow adequate mixing and cure. In some implementations, the viscosity of the combined composition (the combination of the isocyanate-reactive component and the isocyanate-functional component) is from 500 to 2500 centipoise at 72° F. (22° C.), such as 800 to 1200 centipoise, as measured using a Brookfield LVDVI viscometer. Optionally, the viscosity may be adjusted at the time of mixing by heating one or both sides of the multiple part system prior to spray mixing.

The coating compositions described herein are, in some implementations, sprayed on the substrate while maintaining a volumetric ratio of from 1:10 to 10:1, such as 1:3 to 3:1 or 2:1, for the ratio of the isocyanate-reactive component to the isocyanate-functional component.

In certain implementations, the coating composition is applied to an intended substrate at a thickness of from 3 to 100 mils (76.2 to 2540 micrometers), such as 5 to 50 mils (127 to 1270 micrometers). The desired thickness range will usually depend on the ultimate article to be manufactured. In some implementations, a lower film thickness may be desired, such as a coating having a thickness of 5 to 20 mils (127 to 508), or 6 to 8 mils (152 to 203 micrometers). Multiple passes of the spray system may be used until the desired thickness is achieved.

In certain implementations, the coating is applied to a substrate for coating of that substrate as a topcoat. In this embodiment, the coating composition can provides a convenient laminate providing high strength. Thus, existing articles may be readily coated with a new and aesthetically pleasing coating. Examples of such articles include bathtubs, appliance surfaces, furniture such as tables and chairs, counter tops, boats, and the like.

Examples of suitable substrate materials include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, saturated or unsaturated polyurethane composites, saturated or unsaturated polyester composites, asphalt, fiberglass, soil, or gravel.

In certain implementations, the coating is applied to a mold surface as a gelcoat, and allowed to cure with later removal of the mold to provide the shaped article created thereby. It has been found, surprisingly, that at least some implementations of the coatings described herein provide specific benefit as gelcoats because while hard, they can be significantly tougher than traditional unsaturated polyester based gel coats and, as a result, less susceptible to cracking. They also can be weather and UV resistant. Moreover, they can be compatible with unsaturated polyester resin in an underlying glass fiber reinforced laminate and, as a result, resistant to delamination.

While not being bound by theory, it is believed that the hardness properties of the coatings contribute to the ability to demold the gelcoat. If desired, after allowing the coating as applied to the mold to become tack free, subsequent materials such as structural foams, may be applied thereto to provide a more rigid structure. Alternatively, a framework made from a more rigid material, such as metal, wood, composite, fiber reinforced foam, cardboard or the like, may be fastened to the cured coating by adhesive, structural foam, mechanical fasteners, combinations of the above, and the like. The thus prepared gelcoat product preferably has at least sufficient rigidity to be readily removed from the mold.

As a result, in some implementations, this specification is directed to a process comprising applying a release agent, such as a wax, to a mold, applying a coating composition as described in this specification to the waxed mold, applying a glass fiber reinforced laminate to the coating composition, and removing the glass fiber reinforced laminate from the mold to provide a glass fiber reinforced laminate covered by a decorative gel coat layer. In some implementations, the glass fiber reinforced laminate comprises an unsaturated polyester resin.

This specification is also directed to articles produced from such a process. Exemplary articles include, but are not limited to, marine craft, showers, bathtubs, building panels, automotive panels, swimming pools, and satellite dishes.

Various aspects of the subject matter described herein are set out in the following numbered clauses:

Clause 1. A coating composition comprising: (a) a isocyanate-reactive component comprising a polycyclic polyether polyol that is the reaction product of a reaction mixture comprising: (i) a polycyclic polyol starter, and (ii) an alkylene oxide; and (b) an isocyanate-functional component comprising a non-aromatic polyisocyanate.

Clause 2. The coating composition of clause 1, wherein the polycyclic polyol starter comprises a polycyclic diol and/or a polycyclic triol.

Clause 3. The coating composition of clause 1 or clause 2, wherein the polycyclic polyol starter comprises a bicyclic polyol, a tricyclic polyol, and/or a polycyclic polyol that includes four or more rings per molecule.

Clause 4. The coating composition of one of clause 1 to clause 3, wherein the rings of the polycyclic groups of the polycyclic polyol starter are saturated.

Clause 5. The coating composition of one of clause 1 to clause 4, wherein the cyclic groups of the polycyclic polyol starter comprise cyclic groups of 3 atoms, 4 atoms, 5 atoms, 6 atoms, and/or 7 or more atoms.

Clause 6. The coating composition of one of clause 1 to clause 5, wherein the cyclic groups of the polycyclic polyol starter are substituted, such as with one or more heteroatoms, such as nitrogen, oxygen, silicon, sulfur and/or another heteratom.

Clause 7. The coating composition of one of clause 1 to clause 6, wherein one or more cyclic groups of the polycyclic polyol starter comprise an ether (C—O—C) linkage.

Clause 8. The coating composition of one of clause 1 to clause 5, wherein polycyclic polyol starter comprises a bicyclic diol and/or a tricyclic diol in which the bicyclic and tricyclic units comprise tricyclodecane, bicyclodecane, norbornane, bicyclooctane, bicyclononane, isosorbide, or bicycloundecane.

Clause 9. The coating composition of one of clause 1 to clause 8, wherein the polycyclic polyol starter comprises a dicyclic diol comprising a 1,4:3,6-dianhydrohexitols, such as isosorbide, isomannide, isoidide, isogalactide, isofucide and isoinoside.

Clause 10. The coating composition of one of clause 1 to clause 9, wherein the reaction mixture further comprises trimethylolethane, trimethylolpropane, glycerol, pentaerythritol, 4,4'-dihydroxydiphenyl-propane, sorbitol, sucrose, ethylenediamine, monoethanolamine, diethanolamine, methyl amine, ethylene diamine, diethylene triamine, triethylene tetramine, triethanolamine, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, aniline, 4,4'-methylene dianiline, 2,3-toluene diamine, 3,4-toluene diamine, 2,4-toluene diamine, and 2,6-toluene diamine, ammonia, ethanolamine, triethanolamine, and ethylene diamine, a mixture of any two or more of the foregoing, and/or oligomeric and/or polymeric polyols, such as polyether polyols, a methylene-bridged polyphenyl polyamine composed of isomers of methylene dianilines and triamines or polyamines of higher molecular weight prepared by reacting aniline with formaldehyde, and/or a Mannich reaction product of phenol or a substituted phenol with an alkanol amine and formaldehyde or paraformaldehyde.

Clause 11. The coating composition of one of clause 1 to clause 10, wherein the polycyclic polyol starter is present in an amount of at least 50% by weight, at least 80% by weight, at least 90% by weight, at least 98% by weight or at least 99% by weight, based on the total weight of H-functional starter used to prepare the polycyclic polyether polyol.

Clause 12. The coating composition of one of clause 1 to clause 10, wherein the alkylene oxide comprises ethylene oxide, propylene oxide, or a mixture thereof.

Clause 13. The coating composition of one of clause 1 to clause 11, wherein the reaction mixture further comprises an alkoxylation catalyst comprising sodium hydroxide, potassium hydroxide, sodium or potassium methoxide, sodium stearate, calcium oxide, N-methyl imidazole, or a double metal cyanide (DMC) catalyst.

Clause 14. The coating composition of one of clause 1 to clause 13, wherein the polycyclic polyether polyol has a hydroxyl functionality of at least 1.5, such as 1.5 to 6, 1.5 to 4, 1.5 to 3,2 to 3, or 2 to 2.5.

Clause 15. The coating composition of one of clause 1 to clause 14, wherein the polycyclic polyether polyol has a number average molecular weight of no more than 1,500 Da, such as no more than 1,000 Da, no more than 500 Da, or no more than 400 Da, such as 200 Da to 800 Da, 200 Da to 600 Da, 200 Da to 400 Da, or 250 Da to 350 Da.

Clause 16. The coating composition of one of clause 1 to clause 15, wherein the isocyanate-reactive component further comprises an aliphatic hydrocarbon polyol, a different polyether polyol, a polyester polyol, an acrylic polyol, an epoxypolyol, a polycarbonate polyol, and/or a urethane polyol.

Clause 17. The coating composition of one of clause 1 to clause 16, wherein the isocyanate-reactive component comprises a polyaspartic acid ester.

Clause 18. The coating composition of one of clause 1 to clause 17, wherein the non-aromatic polyisocyanate comprises an aliphatic, cycloaliphatic, and/or araliphatic diisocyanate.

Clause 19. The coating composition of one of clause 1 to clause 18, wherein the non-aromatic polyisocyanate comprises a trimer, such as the biuret, allophonate, and/or isocyanurate, of 1,6-hexanediisocyanate.

Clause 20. A process comprising: (a) applying a release agent to a mold; (b) applying the coating composition of one of Clause 1 to Clause 19 over the release agent; (c) applying a glass fiber reinforced laminate to the coating composition, and (d) removing the glass fiber reinforced laminate from the mold.

Clause 21. The process of Clause 20, wherein the glass fiber reinforced laminate comprises an unsaturated polyester resin.

Clause 22. An article produced by the process of clause 20 or clause 21, wherein the article is a marine craft, a shower, a bathtub, a building panel, an automotive panel, a swimming pool, or a satellite dish.

Clause 23. A coating composition comprising: (a) a isocyanate-reactive component comprising a polyether polyol with a hydroxyl functionality of 2 to 2.5 and a number average molecular weight of 200 Da to 400, wherein the polyether polyol is a reaction product of a reaction mixture comprising: (i) a polycyclic polyol starter comprising a tricyclodecane unit, a bicyclodecane, a norbornane unit, a bicyclooctane unit, a bicyclononane unit, an isosorbide unit, or a bicycloundecane unit, and (ii) an alkylene oxide; and (b) an isocyanate-functional component comprising a non-aromatic polyisocyanate.

Clause 24. The coating composition of clause 23, wherein the polycyclic polyol starter comprises a polycyclic diol and/or a polycyclic triol.

Clause 25. The coating composition of clause 23 or clause 24, wherein the polycyclic polyol starter comprises a 1,4:3,6-dianhydrohexitol and/or 4,8-Bis(hydroxymethyl) tricyclo [$5.2.1.0^{2,6}$]decane.

Clause 26. The coating composition of one of clause 23 to clause 25, wherein the reaction mixture further comprises trimethylolethane, trimethylolpropane, glycerol, pentaerythritol, 4,4'-dihydroxydiphenyl-propane, sorbitol, sucrose, ethylenediamine, monoethanolamine, diethanolamine, methyl amine, ethylene diamine, diethylene triamine, triethylene tetramine, triethanolamine, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, aniline, 4,4'-methylene dianiline, 2,3-toluene diamine, 3,4-toluene diamine, 2,4-toluene diamine, and 2,6-toluene diamine, ammonia, ethanolamine, triethanolamine, and ethylene diamine, a mixture of any two or more of the foregoing, and/or oligomeric and/or polymeric polyols, such as polyether polyols, a methylene-bridged polyphenyl polyamine composed of isomers of methylene dianilines and triamines or polyamines of higher molecular weight prepared by reacting aniline with formaldehyde, and/or a Mannich reaction product of phenol or a substituted phenol with an alkanol amine and formaldehyde or paraformaldehyde.

Clause 27. The coating composition of one of clause 23 to clause 26, wherein the polycyclic polyol starter is present in an amount of at least 50% by weight, at least 80% by weight, at least 90% by weight, at least 98% by weight or at least 99% by weight, based on the total weight of H-functional starter used to prepare the polycyclic polyether polyol.

Clause 28. The coating composition of one of clause 23 to clause 26, wherein the alkylene oxide comprises ethylene oxide, propylene oxide, or a mixture thereof.

Clause 29. The coating composition of one of clause 23 to clause 27, wherein the reaction mixture further comprises an alkoxylation catalyst comprising sodium hydroxide, potassium hydroxide, sodium or potassium methoxide, sodium stearate, calcium oxide, N-methyl imidazole, or a double metal cyanide (DMC) catalyst.

Clause 30. The coating composition of one of clause 23 to clause 29, wherein the isocyanate-reactive component further comprises an aliphatic hydrocarbon polyol, a different polyether polyol, a polyester polyol, an acrylic polyol, an epoxypolyol, a polycarbonate polyol, and/or a urethane polyol.

Clause 31. The coating composition of one of clause 23 to clause 30, wherein the isocyanate-reactive component comprises a polyaspartic acid ester.

Clause 32. The coating composition of one of clause 23 to clause 31, wherein the non-aromatic polyisocyanate comprises an aliphatic, cycloaliphatic, and/or araliphatic diisocyanate.

Clause 33. The coating composition of one of clause 23 to clause 32, wherein the non-aromatic polyisocyanate comprises a trimer, such as the biuret, allophonate, and/or isocyanurate, of 1,6-hexanediisocyanate.

Clause 34. A process comprising: (a) applying a release agent to a mold; (b) applying the coating composition of one of clause 23 to clause 33 over the release agent; (c) applying a glass fiber reinforced laminate to the coating composition, and (d) removing the glass fiber reinforced laminate from the mold.

Clause 35. The process of clause 34, wherein the glass fiber reinforced laminate comprises an unsaturated polyester resin.

Clause 36. An article produced by the process of clause 34 or clause 35, wherein the article is a marine craft, a shower, a bathtub, a building panel, an automotive panel, a swimming pool, or a satellite dish.

The non-limiting and non-exhaustive examples that follow are intended to further describe various non-limiting and non-exhaustive embodiments without restricting the scope of the embodiments described in this specification.

Examples

Materials

Desmodur® polyisocyanates from Covestro LLC that were used in the Examples are summarized in Table 1. Polyol starters used in the Examples were obtained from different suppliers as listed in Table 2. Other chemicals used in the Examples were purchased from Sigma-Aldrich unless specified otherwise.

TABLE 1

| Isocyanates | NCO wt % | Avg NCO functionality | Equivalent Weight (g/mol) | Mw (g/mol) | Viscosity RT (cps) |
|---|---|---|---|---|---|
| Desmodur XP 2617 | 12.5 | 2.0 | 335 | 670 | 4250 |
| Desmodur N 3500 | 19.5 | 4.6 | 215 | 1182.5 | 35000 |
| Desmodur XP 2580 | 19.5 | 2.5 | 215 | 537.5 | 500 |
| N 3900 | 23.5 | 3.2 | 180 | 576 | 730 |

TABLE 2

| Polyol Starter # | Chemical | Source | MW (g/mol) | Melting point (° C.) | Average OH Functionality |
|---|---|---|---|---|---|
| 1 | Isosorbide (98% purity) | Acros Organics | 146.1 | 60 | 2 |
| 2 | Isosorbide (>99.5% purity) | Roquette[1] | 146.1 | 60 | 2 |
| 3 | 1,3/1,4-Cyclohexane dimethanol (CHDM) | Dow[2] | 144.2 | NA | 2 |
| 4 | 4,8-Bis(hydroxymethyl)tricyclo[5.2.1.0$^{2,6}$]decane (DCPDM) | Sigma-Aldrich | 196 | NA | 2 |
| 5 | Propylene glycol | Covestro | 76.1 | −59 | 2 |
| 6 | Bisphenol A (BPA) | Sigma-Aldrich | 228.3 | 156 | 2 |
| 7 | Tris (2-Hydroxyethyl) isocyanurate (THEIC) | Sigma-Aldrich | 261.2 | 136-140 | 3 |

[1]Commercially available as Polysorb ® P
[2]a blend of 1,3- and 1,4- isomers of CHDM (liquid at room temperature) commercially available as Onoxol Diol from Dow Chemical Company Mechanical Testing Coatings were tested using the following methods:

| Physical Property | Unit | Test |
|---|---|---|
| Tensile properties | PSI | ASTM D 638-14 |
| Die C tear | PSI | ASTM D 624-12 |
| Durometer Hardness | A/D | ASTM D-2240-15 |
| Split Tear | PSI | ASTM D 1938-14 |

Analytical Methods

Polyols were tested using the following analytical methods:

Hydroxyl number: Sample(s) were analyzed according to ASTM D-4274-11.

Viscosity: Samples were analyzed using an Anton Paar SVM 3000/G2 Stabinger Viscometer following Polyol Method at the temperature specified for analysis at 25° C.

Water content: Sample(s) were analyzed using the standard Analytical Karl Fisher Water Titration method on a Mettler Toledo (C30 and/or V30) water titrator.

Molecular weight analysis: The samples were analyzed in THF using an RI detector on the Oligomer Column set. Molecular weights are based on polystyrene standards using a relative calibration curve.

Acid number analysis: Sample(s) were analyzed using the method "Covestro Analytical, Acid Number in Polyols by potentiometric and Visual Titration."

DSC analysis was performed using a PerkinElmer DSC8000 from −120 to 100° C. (−150° C. block temperature and a He purge); heating and cooling rates were 20° C./min.

Polyol Preparation

The polyols identified in Table 3 were prepared in a stainless steel stirred reactor. To the reactor, the starter and an alkoxylation catalyst were charged at ambient temperature. In some instances, the novel starter was melted in an oven at a temperature slightly higher than its melting point before being charged to the reactor in liquid form. In other instances, the novel starter was charged in its solid form. In some instances, a small amount (0.02 to 0.04 weight percent) of a suitable organic acid was added to neutralize any residual alkalinity contained in the starter. The reactor temperature was raised to the desired temperature at which point the mixture was de-watered using vacuum distillation with a slight nitrogen sparge through the mixture. The reactor was then sealed under vacuum and a small amount (i.e. 8% by weight based on the amount of starter) of alkylene oxide was added to initiate the alkoxylation catalyst, if needed. Based on the drop in reactor pressure, this initiation amount of alkylene oxide may be repeated. In the case of the high purity polycyclic polyol starter, it was discovered that the catalyst did not become fully active until the calculated molecular weight of the polycyclic polyether polyol was 220 Da. Once the alkoxylation catalyst was fully active (as determined by a drop in reactor pressure), the desired amount of alkylene oxide was continuously added to the reactor at a rate sufficient to maintain the reaction pressure (typically below 55 psig). Once the desired amount of alkylene oxide was fed, the reactor was held at the reaction temperature for a sufficient time to fully react any unreacted oxide. The reaction mixture was stripped using vacuum distillation with a slight nitrogen sparge through the mixture. The reactor was cooled to ~90° C. and the reactor was charged with 500 ppm of Irganox® 1076 antioxidant and agitated for 30 minutes before the final polyol was collected. When potassium hydroxide was used as the alkoxylation catalyst, the catalyst was removed by neutralizing with a suitable organic acid and the resultant salts were filtered from the final polyol. Results are set forth in Table 3.

TABLE 3

| Polyol # | Starter | Charge (° C.) | Reaction (° C.) | Eq. Wt. | Theo MW (g/mol) | Mn (GPC) | Mw (GPC) | Tg DSC (° C.) | Viscosity (cps) | Catalyst | APHA Color | Acid No | Water % |
|---|---|---|---|---|---|---|---|---|---|---|---|---|---|
| 1 | 1 | RT[2] | 110 | 138.5 | 277 | 316 | 331 | NA | 1154 | KOH | Very high | 0.267 | 0.033 |
| 2 | | 80 | 130 | 164.5 | 329 | 383 | 407 | NA | 1203 | DMC | NA[1] | 0.020 | 0.116 |
| 3 | 2 | RT | 110 | 154.1 | 308 | 346 | 359 | −45 | 880 | KOH | 523 | 0.177 | 2.48 |
| 4 | | RT | 110 | 949.2 | 1898 | 2715 | 2821 | −66 | 462 | KOH | 54 | 0.258 | 0.34 |
| 5 | | 80 | 130 | 155.0 | 310 | 347 | 366 | −44 | 1335 | DMC | 74.3 | 0.017 | NA |
| 6 | | RT | 130 | 519.4 | 1039 | 1323 | 1356 | −61 | 382 | DMC | 37.3 | 0.005 | NA |
| 7 | | RT | 130 | 1035.1 | 2070 | 2849 | 2946 | −64 | 537 | DMC | 36.6 | 0.003 | NA |
| 8 | | 80 | 130 | 250.4 | 501 | 597 | 617 | −54 | 507 | DMC | 144 | 0.004 | 0.020 |
| 9 | | RT | 130 | 151.6 | 303 | 336 | 355 | −46 | 1420 | DMC | 90.5 | 0.031 | 0.025 |
| 10 | 3 | RT | 130 | 155.8 | 311.6 | 420 | 436 | −59 | 498 | DMC | 44.8 | 0.016 | 0.011 |
| 11 | | RT | 130 | 524.3 | 1048.6 | 1419 | 1445 | −66 | 294 | DMC | 43.3 | 0.01 | 0.012 |
| 12 | | RT | 130 | 1048.6 | 2097.2 | 3020 | 3091 | −67 | 489 | DMC | 49.8 | 0.008 | 0.007 |
| 13 | 4 | 60 | 130 | 156.7 | 313.4 | 357 | 371 | −38 | 5079 | DMC | 33.5 | 0.009 | 0.010 |
| 14 | | RT | 130 | 539.4 | 1078.8 | 1355 | 1384 | −62 | 443 | DMC | 25.7 | 0.006 | 0.013 |
| 15 | | RT | 130 | 1054.5 | 2109 | 2895 | 2964 | −65 | 577 | DMC | 36.3 | 0.006 | 0.011 |
| 16 (Multranol® 9198) | 5 | RT | NA | 109 | 218 | NA | NA | −76 | 55 | KOH | | 0.1 | 0.15 |
| 17 (Arcol® 425) | | RT | NA | 212.5 | 425 | NA | NA | −75 | 73 | KOH | 40 | 0.012 | 0.03 |
| 18 | 6 | NA | 170 | 357.3 | 714.6 | 891 | 980 | −43 | 2442 | DMC | 101.2 | 0.012 | 0.042 |
| 19 | | NA | 170 | 409.5 | 819 | 1058 | 1138 | −47 | 1582 | DMC | 83 | 0.006 | 0.02 |
| 20 | | NA | 170 | 293.7 | 587.4 | 761 | 797 | −39 | 4428 | DMC | 73.3 | 0.012 | 0.019 |
| 21 | 7 | NA | 160 | 273.7 | 820.9 | 908 | 1070 | −48 | 2681 | DMC | 127 | 0.016 | 0.015 |
| 22 | | NA | 160 | 350.6 | 1051.9 | 1219 | 1480 | −54 | 1448 | DMC | 160.3 | 0.014 | 0.028 |
| 23 | 2 | 80 | 130 | 251.6 | 503.1 | 592 | 612 | NA | 517 | DMC | 236.7 | 0.016 | 0.043 |
| 24 | | 80 | 130 | 148.8 | 297.6 | 331 | 350 | NA | 1502 | DMC | 450.9 | 0.016 | 0.024 |

[1]Polyol 2 had a Gardner Color of 16.9.
[2]RT = Room Temperature

Formulation Procedure

Each of the recipes described by Tables 4-8 was prepared at an NCO/OH molar ratio of 1.05 and included 0.1% by weight of a tin catalyst (Reaxis C233) and 0.2% by weight of a defoamer (Tego Airex 990). A Max 200 Long cup (FlackTek Inc.) was charged with all the non-reactive ingredients and polyisocyanates. The mixture was then mixed using a FlackTek speed mixer for 2 min at 2000 rpm. The ingredients were then degassed in a vacuum oven under vacuum to 10 mmHg at room temperature for approximately 10 minutes. The homogeneous mixture was then cast onto a glass plate (12×12 in), coated with a wax-based mold release agent and outfitted with a ⅛ inch thick frame to produce a plaque of approximately 12 inches×12 inches×⅛ inch. The mold was kept at room temperature during casting. The mold was cured at room temperature for 24 hours and then removed from the mold for further testing. The cast polyurethane gel coat plaques were approximately 3 mm thick unless specified otherwise.

Results

Initial tests were conducted using gel coat comprising low molecular weight polypropylene glycol with aliphatic polyisocyanates. Results are summarized in Table 4.

TABLE 4

| Example | Polyol 1 | Polyol 2 | Polyol weight Ratio | Isocyanate | Tensile Strength (PSI) | Elong. @ Break | Split Tear | Die C Tear | Shore A/D |
|---|---|---|---|---|---|---|---|---|---|
| 1 (comp.) | Arcol PPG 425 | — | — | XP 2580 | 172.7 | 67.4 | 3.8 | 14.6 | 45-45A |
| 2 (comp.) | Arcol PPG 425 | Isosorbide* | 75/25 | XP 2580 | 413 | 170.2 | 10.7 | 29.6 | 45-43A |

*Isosorbide from Sigma-Aldrich

As is seen, Example 1 produced softer polyurethane Example 2 was a blend of isosorbide and a low MW PPG. Solid isosorbide is insoluble in polyisocyanates while isosorbide can be dissolved into PPG. The mixture can be subsequently mixed with polyisocynates. Addition of isosorbide into PPG in polyurethanes slightly improved the tear strength, increased the tensile strength and elongation at break, but did not show much impact on the coating hardness. Next, experimental isosorbide polyol 1 was tested either alone or blended with a similar MW polypropylene glycol (Multranol® 9198). Results are set forth in Table 5.

TABLE 5

| Example | Polyol A | Polyol B | Weight Ratio (Polyol A/B) | Isocyanate | Tensile Strength (psi) | Elongation @ Break (%) | Split Tear (psi) | Die C Tear (psi) | Shore A/D |
|---|---|---|---|---|---|---|---|---|---|
| 3 | Polyol 1 | — | — | XP 2617 | 2150 | 523 | 68.9 | 116.7 | 65-55A |
| 4 | Polyol 1 | — | — | N 3500 | 8165 | 6.25 | 187.5 | 562 | 74-72D |
| 5 | Polyol 1 | — | — | XP 2580 | 3050 | 163 | 303 | 583 | 62-57D |
| 6 | Polyol 1 | Polyol 16 | 75/25 | XP 2580 | 1590 | 151 | 90.3 | 150.3 | 52-42D |
| 7 | Polyol 1 | Polyol 16 | 50/50 | XP 2580 | 1086.7 | 142.6 | 48.6 | 96.9 | 44-36D |
| 8 | Polyol 1 | Polyol 16 | 25/75 | XP 2580 | 616.3 | 107.7 | 26.5 | 68.4 | 30-26D |
| 9 | — | Polyol 16 | — | XP 2580 | 754.3 | 123.7 | 16.7 | 49 | 26-24D |

It was observed that polarity and NCO functionality of polyisocyanate could affect tensile strength and elongation at break and XP2580 seemed to provide the right balance. By using XP 2580, the gel coat achieved high shore D hardness, high tear strength and outstanding tensile strength and elongation at break. Upon blending Polyol 1 with Polyol 16, no synergistic effect was observed. As illustrated in Table 5, adding Polyol 16 reduced most mechanical properties. From this, it was concluded that rigid polyol is critical to obtain the desired tensile strength, elongation at break, and hardness.

Three additional isosorbide-started polyols with varied molecular weight were tested. Results are set forth in Table 6.

TABLE 4

| Example | Polyol # | Polyol M.W. | Isocyanate | Tensile Strength | Elongation @ Break | Split Tear | Die C Tear | Shore A/D |
|---|---|---|---|---|---|---|---|---|
| 10 | 5 | 309.9 | XP 2580 | 2886.7 | 172.3 | 194.5 | 361.7 | 58-50D |
| 11 | 7 | 2070.1 | XP 2580 | 111.7 | 92.5 | 4.1 | 11.9 | 41-41A |
| 12 | 8 | 500.9 | XP 2580 | 662.7 | 168.6 | 9.1 | 37.8 | 64-64A |

From the data in Table 6, it was concluded that isosorbide-started polyols with short propylene oxide length achieved the highest elongation at break and hardness in the polyurethane.

Similar isosorbide polyol samples were prepared using isosorbide from different sources. Results are set forth in Table 7. At similar molecular weight and with short propylene oxide units, these polyols seemed to produce similar performance except one sample (Example 18).

TABLE 7

| Example | Polyol # | M.W. of Polyol | Isocyanate | Tensile Strength | Elongation @ Break | Split Tear | Die C Tear | Shore A/D |
|---|---|---|---|---|---|---|---|---|
| 13 | 1 | 277 | XP 2580 | 3050 | 163 | 303 | 583 | 62-57D |
| 14 | 3 | 308.2 | N 3900 | 4430.0 | 19.7 | 279.0 | 797.0 | 70-68D |
| 15 | 7 | 308.2 | XP 2580 | 2736.7 | 165.0 | 217.0 | 390.3 | 65-59D |
| 16 | 9 | 303.0 | XP 2580 | 2657.0 | 167.1 | 185.0 | 374.7 | 51-41D |
| 17 | 9 | 303.0 | XP 2747 | 2543.3 | 113.9 | 232.5 | 510.7 | 62-56D |
| 18 | 2 | 329.0 | XP 2580 | 1683.0 | 182.8 | 79.7 | 149.7 | 33-23D |
| 19 | 23 | 251.6 | XP 2747 | 3826.7 | 32 | NA | 718.7 | 68-66D |

Other types of polyol samples (non-isosorbide started) were also tested. Results are set forth in Table 8.

TABLE 8

| Example | Polyol # | M.W. of Polyol | Isocyanate | Tensile Strength | Elongation @ Break | Split Tear | Die C Tear | Shore A/D |
|---|---|---|---|---|---|---|---|---|
| 20 | 18 | 357.3 | XP 2747 | 536.7 | 73.3 | 11.69 | 38.87 | 30-30D |
| 21 | 19 | 409.5 | XP 2747 | 375.7 | 53.83 | 5.66 | 21.33 | 29-29D |
| 22 | 20 | 293.7 | XP 2747 | 1028 | 100.2 | 46.5 | 115 | 32-26D |
| 23 | 21 | 273.7 | XP 2747 | 646 | 52.1 | 8.74 | 41.2 | 28-26D |
| 24 | 22 | 350.6 | XP 2747 | 372.7 | 47.7 | 6.26 | 29.9 | 21-20D |
| 25 | 13 | 313.4 | XP 2580 | 3810.0 | 175.4 | 429.5 | 791 | 72-69D |
| 26 | 14 | 1078.8 | XP 2580 | 182.3 | 70.0 | 4.9 | 16.6 | 50-50A |
| 27 | 15 | 2109 | XP 2580 | 104.6 | 104.9 | 4.2 | 10.9 | 30-30A |
| 28 | 10 | 311.6 | XP 2580 | 822.3 | 134.4 | 41.2 | 82.8 | 75-68A |
| 29 | 12 | 2097.2 | XP 2580 | 136.0 | 71.6 | 4.5 | 10.2 | 38-38A |

As is apparent, gel coats produced using the BPA and Theic started polyols were inferior to the gel coats from isosorbide polyols. For the DCPDM based polyols, at a short PO length, the resultant polyurethane also showed very good performance. This type of starter has an aliphatic rigid bi-ring similar to isosorbide. For CHDM starter, the six-member may be less rigid compared to the bi-ring structure in DCPDM and the final polyurethane samples had poorer mechanical properties.

Testing of Commercial Gel Coat Samples

AROPOL MR 17104 resin is an NPG-ISO based unsaturated polyester resin developed for use as a gel coat base resin. Aropol MR 17104 was used per the guiding procedure. The resin was diluted to 60% solids with styrene monomer, promoted with 0.083 wt % Co-12%, and then initiated with 2% DDM-9. The formulation had a gelation time between 10-15 min and cured into a hard solid in 1 hour. The resin was fully cured after 24 hours. Other gel coat samples were fully formulated and used per the guiding procedure. All the formulations showed similar curing. Results are in Table 9.

TABLE 9

| Commercial gel coat | | Tensile Strength | Elongation @ Break (%) | Split Tear | Die C Tear | Shore Hardness |
|---|---|---|---|---|---|---|
| FGCI Commercial Gelcoat | NPG White | 2719.5 | 1.15 | NA* | 68.37 | 83-82D |
| Aropol MR 17104 | NPG Resin | 5695.6 | 1.6 | NA | 113 | 68-67D |
| Polyaspartic Gelcoat | | 6840 | 3.73 | 34.95 | 291.7 | 70-72D |

*broke before getting any reading

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising:
   (a) an isocyanate-reactive component comprising a polycyclic polyether polyol that is the reaction product of a reaction mixture comprising:
      (i) a polycyclic polyol starter, and
      (ii) an alkylene oxide; and
   (b) an isocyanate-functional component comprising a non-aromatic polyisocyanate, wherein the polycyclic polyol starter comprises a polycyclic diol, or the cyclic groups of the polycyclic polyol starter include an ether linkage.

2. The coating composition of claim 1, wherein the polycyclic polyol starter is a bicyclic polyol and/or a tricyclic polyol.

3. The coating composition of claim 1, wherein the cyclic groups of the polycyclic polyol starter are saturated.

4. The coating composition of claim 1, wherein the cyclic groups of the polycyclic polyol starter have 5 atoms and/or 6 atoms.

5. The coating composition of claim 1, wherein the polycyclic diol comprises a tricyclodecane unit, a bicyclodecane unit, a norbornane unit, a bicyclooctane unit, a bicyclononane unit, an isosorbide unit, or a bicycloundecane unit.

6. The coating composition of claim 1, wherein the polycyclic diol is 1,4:3,6-dianhydrohexitol.

7. The coating composition of claim 1, wherein the polycyclic polyether polyol has a hydroxyl functionality of 1.5 to 3.

8. The coating composition of claim 7, wherein the hydroxyl functionality is 2 to 2.5.

9. The coating composition of claim 1, wherein the polycyclic polyether polyol has a number average molecular weight of 200 Da to 600 Da.

10. The coating composition of claim 9, wherein the number average molecular weight is 250 Da to 350 Da.

11. A process to produce a glass fiber reinforced laminate covered by a decorative gel coat layer, comprising:
(a) applying a release agent to a mold;
(b) applying the coating composition of claim 1 over the release agent,
(c) applying a glass fiber reinforced laminate to the coating composition, and
(d) removing the glass fiber reinforced laminate from the mold.

12. The process of claim 11, wherein the glass fiber reinforced laminate comprises an unsaturated polyester resin.

13. A coating composition comprising:
(a) an isocyanate-reactive component comprising a polycyclic polyether polyol with a hydroxyl functionality of 2 to 2.5 and a number average molecular weight of 200 Da to 400 Da, wherein the polycyclic polyether polyol is a reaction product of a reaction mixture comprising:
(i) a polycyclic polyol starter comprising a tricyclodecane unit, a bicyclodecane unit, a norbomane unit, a bicyclooctane unit, a bicyclononane unit, an isosorbide unit, or a bicycloundecane unit, and
(ii) an alkylene oxide; and
(b) an isocyanate-functional component comprising a biuret, allophonate, and/or isocyanurate of 1,6-hexanediisocyanate.

14. The coating composition of claim 1, wherein:
(1) the polycyclic diol is 1,4:3,6-dianhydrohexitol and/or 4,8-Bis(hydroxymethyl) tricyclo[5.2.1.0²,⁶]decane; and
(2) the alkylene oxide is propylene oxide.

15. A process to produce a glass fiber reinforced laminate covered by a decorative gel coat layer, comprising:
(a) applying a release agent to a mold;
(b) applying the coating composition of claim 13 over the release agent,
(c) applying a glass fiber reinforced laminate to the coating composition, and
(d) removing the glass fiber reinforced laminate from the mold.

16. The process of claim 15, wherein the glass fiber reinforced laminate comprises an unsaturated polyester resin.

17. A coating composition comprising:
(a) an isocyanate-reactive component comprising a polycyclic polyether polyol that is the reaction product of a reaction mixture comprising:
(i) a polycyclic polyol starter, and
(ii) an alkylene oxide; and
(b) an isocyanate-functional component comprising a biuret, allophonate, and/or isocyanurate of 1,6-hexanediisocyanate.

18. The coating composition of claim 17, wherein the polycyclic polyol starter comprises a bicyclic polyol and/or a tricyclic polyol.

19. The coating composition of claim 17, wherein the polycyclic polyol starter comprises a tricyclodecane unit, a bicyclodecane unit, a norbomane unit, a bicyclooctane unit, a bicyclononane unit, an isosorbide unit, or a bicycloundecane unit.

20. The coating composition of claim 17, wherein the polycyclic polyether polyol has a number average molecular weight of 200 Da to 600 Da.

* * * * *